(12) United States Patent
Jin et al.

(10) Patent No.: US 6,860,648 B2
(45) Date of Patent: Mar. 1, 2005

(54) MULTI CHANNEL OPTICAL TRANSMITTER/RECEIVER MODULE AND MANUFACTURING METHOD THEREOF

(75) Inventors: Yong-Sung Jin, Sunnyvale, CA (US); Hyung-Jae Lee, Sunnyvale, CA (US); Yung-Sung Son, Sunnyvale, CA (US)

(73) Assignee: Opti Japan Corporation, Tokyo (JP)

( * ) Notice: Subject to any disclaimer, the term of this patent is extended or adjusted under 35 U.S.C. 154(b) by 110 days.

(21) Appl. No.: 10/284,627

(22) Filed: Oct. 30, 2002

(65) Prior Publication Data

US 2003/0072538 A1 Apr. 17, 2003

Related U.S. Application Data

(63) Continuation of application No. 09/608,207, filed on Jun. 30, 2000, now abandoned.

(51) Int. Cl.[7] .................................................. G02B 6/36
(52) U.S. Cl. .............................. 385/89; 385/88; 385/92
(58) Field of Search ............................ 385/89, 88, 92, 385/53, 76, 77

(56) References Cited

U.S. PATENT DOCUMENTS 4,845,052 A  *  7/1989  Abend ........................ 437/209
5,555,333 A  *  9/1996  Kato ............................. 385/89
6,272,272 B1  *  8/2001  Ford .............................. 385/52
2002/0025122 A1  *  2/2002  Ouchi et al. ................... 385/88

* cited by examiner

Primary Examiner—Akm Enayet Ullah
Assistant Examiner—Sung Pak
(74) Attorney, Agent, or Firm—Squire, Sanders & Dempsey, L.L.P.

(57) ABSTRACT

An optical transmitter/receiver unit having an optical connector with an optical device array block and a multi channel optical fiber block is presented. The optical device array block includes at least one optical device for converting an electric signal to an optical signal or for converting an optical signal to an electrical signal. The optical devices is mounted on a silicon optical bench having a series of grooves for inserting, attaching and aligning each optical device. The optical device array block can be optically coupled to a multi channel optical fiber block that includes at least one optical fiber for transmitting an optical signal, the optical fiber being mounted in V-shaped grooves on a silicon V block. The V-shaped grooves on the V-block and the mounting grooves on the silicon optical bench allow for accurate alignment of each optical fiber with corresponding optical devices. In the optical device array block, a surface of metal lead connected to an electrode of optical device is formed widely so as to enable ball bonding of wires between the electrodes of the optical devices and the metal leads.

17 Claims, 11 Drawing Sheets

The horizontal distance between the laser diode and center of the optical fiber ($\mu m$)

MULTI CHANNEL OPTICAL TRANSMITTER/RECEIVER MODULE AND MANUFACTURING METHOD THEREOF

CROSS REFERENCE TO RELATED APPLICATION

This application is a continuation of U.S. patent application Ser. No. 09/608,207, filed Jun. 30, 2000, entitled "Multi Channel Optical Transmitter/Receiver Module And Manufacturing Method Thereof" now abandoned.

BACKGROUND

1. Field of the Invention

The present invention relates to a multi channel optical transmitter/receiver module and, more particularly, to a multi channel optical transmitter/receiver module having precise alignment of optical devices and optical fibers.

2. Description of Related Art

Recently, communication systems designers are vigorously adapting their designs for the use of optical fiber technology in various communication fields. Optical communication systems enable use of high frequency signals and suffer less signal loss than conductor based technologies and are therefore better suited for the high bandwidth communications that are increasingly in demand. Optical communication systems are suitable to use in high speed-long distance transmission systems.

During optical transmission of data, one channel of series data is generally utilized for transmitting parallel data on N channels. In this case, the transmission speed of the series data should be at least N times faster than each of the parallel data channels. High speed transmission circuits require expensive equipment; therefore, multiple transmission channels are often utilized to reduce the burden of a high speed transmitting circuit. In order to use multiple optical channels, a plurality of optical transmission systems, each including a light source, an optical fiber, and light detector, are required. For multi channel optical transmitter/receiver modules, an accurate alignment of optical fibers with sources and detector is required not only for each channel but also for adjacent channels. Therefore, multi channel optical transmitter/receiver modules need an optical connector which is highly accurate and, consequently, is more complicated than that of a single channel optical transmitter/receiver module.

FIG. 3 is an exemplary schematic diagram illustrating an active alignment method for a multi channel optical transmitter/receiver module 101. In order to arrange laser diodes 100, for example, with respect to optical fibers 110, laser diodes 100 are first fixed so that they are separated by regular, usually uniform, intervals. Next, optic fibers 110 are fixed on a block 120 having grooves with the same regular intervals with which the laser diodes have been fixed. Then, laser diodes 100 and optical fibers 110 are aligned by moving block 120 with respect to laser diodes 100. Block 120 can be moveable in all three directions. An optimal alignment between optical fibers 110 and laser diodes 100 can be achieved by monitoring the optical output power from each optical fiber of optical fibers 110 while moving block 120. When the output power from each of optical fibers 110 is maximized, block 120 can be fixed relative to diodes 100. This method is referred to as the active alignment method because the maximum output power is sought by monitoring the optical output power from fibers 110. The active alignment method can approach the optimum alignment, however it requires expensive equipment and a lot of labor hours to accomplish. Further, the active alignment method does not lend itself to systems where plugable connectors are desirable.

FIG. 4 is an exemplary schematic diagram illustrating a passive alignment method for a multi channel optical connector module 201. In contrast to the active alignment method illustrated in FIG. 3, the passive alignment method adjusts the locations of optical fibers 221 without monitoring any optical output power. Multi channel optical connector module 201, utilizing the passive alignment method, includes an optical device array block 210 with optical devices 200, each electrically coupled to one of electrical conductors 211, arranged to have regular, uniform, intervals and a multi channel optical fiber block 220 having optical fibers arranged with the same regular intervals as that of optical devices 200 of optical device array block 210. Optical device array block 210 can be fixed on a substrate (not shown) by soldering. Multi channel optical fiber block 220 can be plugable. Optical fibers 221 is then aligned with optical devices 200 when multi channel optical fiber block 220 is plugged into optical device array block. Optical devices 200 can be laser diodes or photodiodes. Even though the passive alignment method is not optimized as with the active alignment method, it has the advantage of being faster (requiring fewer labor hours), requires less expensive equipment, and therefore is less expensive to perform.

FIGS. 6 and 7 illustrate a conventional method of producing connector 201 of FIG. 4. Typically, an optical transmitter/receiver module will include two connectors such as connector 201 of FIG. 4 arranged such that light sources in one connector are coupled with light detectors in the other connector via optical fibers.

FIG. 6 shows an assembly diagram of a conventional method of performing the passive alignment method for multi channel optical fiber block 220. A connector block 310 is grooved with grooves 311 having uniform intervals, and optical fibers 320 are inserted in the grooves. Optical fibers 320 are fixed in place by a cover 300, which can also be grooved with grooves 312 having the same uniform intervals as connector block 310. Connector block 310 is usually made from a plastic material for ease of manufacturing and lowered cost. End facets 321 of optical fibers 320 are usually smoothly polished in order to facilitate the coupling of light into and out of optical fibers 320.

As discussed so far, the conventional multi channel optical fiber block is generally made of a plastic molding forming a solid body with grooves for laying optical fibers. The plastic molding has advantages for mass production and is inexpensive to produce, but results in large alignment errors in placement and spacing of optical fibers 320. Because the alignment error of the plastic is large, a 0.5 mm or larger diameter plastic optical fiber should be used, enabling light to be easily coupled into the optical fiber from laser diodes. If an optical fiber having larger diameter than the diameter of the light receiving aperture of the photo diode is used, however, all of the light coming from the laser diode could be entered to the optical fiber, but all of the light transmitted out of the optical fiber would not be entered to the photodiode. Consequently, the overall loss of light through the system is increased.

FIGS. 7(a) through 7(c) show an assembly diagram of a conventional method of performing the passive alignment method for an optical device array block 210. As with multi channel optical fiber block 220 of FIG. 6, optical device array block 210 can be made from molded plastic. As shown in FIG. 7 (a), a thin metal plate 420 for laying optical devices 430 and a set of metal leads 410 for transmitting electric signals is insterted and fixed into an array block 400. Next, as shown in FIG. 7(b), optical devices 430, which can be laser diodes or photodiodes, are affixed on the thin metal plate 420 by using a conductive adhesive such as, for example, a silver epoxy. Optical devices 430 and a bundle of the optic fibers 320 as shown in FIG. 6 are each arranged with the same uniform intervals. Electrodes are formed at the top and bottom surfaces of optical devices 430. Because all of the bottom surfaces of optical devices 430 are affixed on metal plate 420 by the conductive adhesive, the bottom surfaces of the optical devices 430 form a common electrode.

As shown in FIG. 7 (c), the top surface of each optical device 430 is connected to a corresponding one of metal leads 410 by a wire 431, usually a gold wire. The bottom surface of each of optical devices 430 is affixed to metal plate 420, which forms a common electrode and is also connected to one of metal leads 410 by a wire 431, usually a gold wire. Generally, gold wire is affixed to optical device 430 and metal plate 420 by ball bonding using ultra sonic techniques, and gold wire is affixed to metal lead 410 with silver epoxy.

TABLE 1 shows the result of a calculation for an allowable tolerance of the alignment depending on the various diameters of optical fibers and a coupling efficiency between the optical fiber and optical devices. The allowable tolerance for alignment between a laser diode and an optical fiber is based on the requirement that more than about 90% of the maximum optical output of the laser diode be coupled into the optical fiber. The allowable tolerance of alignment between an optical fiber and a photo diode is based on the requirement that more than about 90% of the maximum light output from the optical fiber be coupled into the photo diode.

In the calculations of Table 1, the divergence angle of the laser diode beam is assumed to be about 15°. The diameter of the light receiving aperture of the photodiode is assumed to be about 200 $\mu$m. Additionally, the laser diode is separated by about 450 $\mu$m from the optical fiber.

It is very difficult to manufacture such a connector and satisfy the allowable tolerances with plastic molding. The passive alignment method is generally accomplished with plastic optical fiber having relatively large diameters, generally about 0.5~1.0 mm, for properly transmitting the optical signal.

Moreover, if a 0.0625 mm diameter multi mode silica optical fiber is used, it is extremely difficult to satisfactorily manufacture the connector with the required reduced alignment tolerances by plastic molding. However, even though the amount of the output of the laser diode actually coupled into the multi mode silica optical fiber is small, all of the light coming out from the optical fiber can be coupled into the photodiode. Thus, the maximum output of the photodiode is almost same as that of the 0.5 mm diameter optical fiber. Moreover, the silica optical fiber is essential for high speed-long distance signal transmission because silica optical fiber has almost no loss of power and a high cut-off frequency compared with plastic optical fiber.

The multi channel optical connector module manufactured by the conventional passive alignment method shown in FIGS. 6 and 7 has the advantage of being faster and simpler to perform than the active alignment method. However, there are some problems in the conventional passive alignment method.

For the multi channel optical fiber array block, the alignment error between the optical devices 430 (FIG. 7) and the optical fiber 320 (FIG. 6) is increased because connector block 310 and grooves 311 for laying the optical fibers are manufactured as a solid body by plastic molding. Plastic optical fiber can be utilized for reducing alignment error, but plastic optical fiber results in greater signal loss and is not adequate for high frequency transmission.

Additionally, it is very hard to affix optical devices 430 accurately on metal plate surface 420 because optical device array block 400 has no alignment key for arranging optical devices 420 accurately on rectangular metal plate surface 420. The width and height of each of optical devices 430 is generally about 0.3~0.5 mm. Due to the small size of each of optical devices 430, it is very difficult to affix each of

TABLE 1

| Optical fiber core diameter | Laser diode-Optical fiber Allowable tolerance of alignment | Optical fiber-Photo diode Allowable tolerance of alignment | Laser diode-Optical fiber Maximum coupling efficiency | Optical fiber-Photo diode Maximum coupling efficiency | Total Maximum Coupling efficiency |
| ---: | ---: | ---: | ---: | ---: | ---: |
| 0.5 mm | ±140 $\mu$m | ±90 $\mu$m | 100% | 21% | 21% |
| 0.25 mm | ±40 $\mu$m | ±45 $\mu$m | 90% | 67% | 60% |
| 0.0625 mm | ±20 $\mu$m | ±65 $\mu$m | 16% | 100% | 16% |

If a 0.5 mm core diameter plastic optical fiber is used, it would be possible to manufacture the connector having approximately 100 $\mu$m of allowable tolerance of alignment between the optical fiber and the laser diode by plastic molding. However, only 21% of the light output from the optical fiber can be coupled into the photodiode. Alternatively, if a 0.25 mm core diameter plastic optical fiber is used, 67% of the light output from the optical fiber can be coupled to the photodiode. The decreased diameter of the optical fiber can bring three times the signal to the photo diode without increasing the output of the laser diode; however, the allowable tolerance of alignment between the optical fiber and the laser diode would be reduced by a factor of about 0.3 that of the 0.5 mm diameter plastic optical fiber.

optical devices 430 by the naked eyes. Optical devices 430 are usually affixed with uniform intervals on metal plate 420 using a magnified image through a microscope. Because there are no alignment keys for locating optical devices 430, the accuracy of placement is low. A series of grooves to be used as alignment keys for placement of optical devices 430 could be marked on metal plate 420, but it is not easy to mark grooves that small on metal plate 420, which has a width of approximately 0.5 mm and a length approximately 6 mm. In order to mark a groove having a tolerance of 0.05 mm or below requires extremely precise skills. For measuring a precise distance, an expensive optical vision system would be needed. Besides, the alignment of each of optical devices 430 is required. Therefore, the assembly process will be very complicated and slow.

Additionally, it is not easy to solder a conventional optical device array block 440. Metal plate 420 must be heated to about 200~250° C. for soldering. But, the optical device array block 440, being made of plastic, has poor heat conductivity. Therefore, heat would not be properly transferred to metal plate 420, which is disposed inside of optical device array block 440. Additionally, heat would deform the plastic material of the optical device array block 440. Additionally, when optical devices 430, which are laid on metal plate 420, are heated at the same time, the heat would melt the solder of the pre-soldered optical devices and cause displacement of the optical devices from the original position. However, soldering is needed because a conductive adhesive used for coupling between optical devices 430 and metal plate 420 causes increased resistance and weakens the transmission of high frequency signals. Soldering the optical devices one by one would be very a painful job. A one-time soldering method is desired to efficiently affix and couple optical devices 430 to metal plate 420. In the one time soldering method, the plurality of arranged optical devices must be fixed during the soldering to avoid displacing the arranged optical devices. However, it is not easy to hold the plurality of arranged optical devices 430 during the soldering process.

It is also very difficult to use a ball bonding method with a narrow surface, such as metal leads 410, when a wire 431 is connected to the metal lead for the conventional optical devices array 440. Thus, soldering is replaced by a conductive adhesive for connection of wires 431. The conductive adhesive weakens the transmission of high frequency signals. Moreover, wide metal plate 420, on which optical devices 430 is fixed, acts as an antenna and both radiates and receives electromagnetic fields, creating a high level of electromagnetic noise.

Therefore, there is needed a multi channel optical connector module capable of being precisely aligned in a fast, cost sensitive fashion. Additionally, there is a need for a multi channel optical connector module having efficient throughput without creating large electromagnetic noise.

SUMMARY

In accordance with the present invention, a multi channel optical transmitter/receiver module enabling accurate alignment of optical fibers and optical devices and supporting transmission of high frequency signals without interference or noise is presented. In many embodiments, ball bonding techniques are utilized to couple the optical devices with metal leads.

In one embodiment, a multi channel optical transmitter/receiver module includes a connector having an optical device array block including at least one optical device arranged on a silicon optical bench having a series of grooves for inserting, attaching and aligning each optical device, and a multi channel optical fiber block including at least one optical fiber capable of being optically coupled to the at least one optical device of the optical device array block and a silicon V block for arranging each of the at least one optical fiber in a series of V-shaped grooves.

Some embodiments of the module further include a second connector, the second connector having a second multi channel optical fiber block for receiving the at least one optical fiber, the second multi channel optical fiber block having a V-block having V-grooves for arranging and fixing each of the at least one optical fiber. Some embodiments further include a second optical device array block having at least one optical device arranged on a silicon optical bench, the at least one optical device of the second optical device array block being capable of being coupled to the at least one optical fiber to transmit or receive optical signals to or from the at least one optical device of the first connector.

Some embodiments of the invention further provide metal leads which are electrically coupled to the at least one optical device of the optical device array block or the at least one optical device of the second optical device array block. The metal leads are prepared by a method comprising the steps of inserting a metal lead frame having a widely formed end portion into the optical device array block so that the widely formed end portion is proximate to the at least one optical device, bending said metal lead frame, e.g. by about 90°, and cutting the metal lead frame, thereby forming a surface at the widely formed end for coupling to the optical device. A ball bonding method can then be used for coupling between the top and bottom electrodes of the optical device and the metal leads. An optical adhesive molding can be used for protecting the optical devices, the widely formed ends of the widely formed ends of the metal lead, and the bonding wire.

In some embodiments, the silicon optical bench and the silicon V block can be produced by the same processing techniques as that used for producing MEMS (micro electromechanical machine system) devices (i.e., the MEMS technique). Grooves are formed in a silicon substrate in order to facilitate precise placement of each of the optical devices. The silicon optical bench is made of insulating material, therefore the bottom electrode of each of the optical devices is electrically isolated and coupled to one of the widely formed ends of the metal leads through metal pads at the bottom of the groove. The top surface of the silicon optical bench can be coated with an insulating film. Therefore, each bottom electrode of an optical device is electrically isolated and can be coupled separately to metal leads. The optical devices can be either transmitting devices or receiving devices and can be arranged to enable bi-directional transmission of data.

In another embodiment of the invention, an optical device array block includes at least one optical device for converting an electrical signal to an optical signal or for converting an optical signal to an electrical signal, a connector body plug-able with the multi channel optical fiber block, at least one metal lead for electronically coupling electrical signals to the optical device and a silicon optical bench having a series of grooves for inserting, attaching and arranging each optical device. The multi channel optical fiber block includes at least one optical fiber being coupled to the optical device array block for transmitting an optical signal, a connector body plug-able to the optical device array block and a silicon V block for arranging and aligning each optical fiber in a series of V-shaped grooves.

A manufacturing method for producing a multi channel optical fiber block for a multi channel optical transmitter/receiver module according to the present invention includes the steps of: preparing a silicon V block having a series of V-shaped grooves for inserting and aligning optical fibers at uniform intervals, producing a connector body by plastic molding, the connector body being arranged to receive and fix the silicon V block, attaching a bundle of optical fibers into said silicon V block and closing a lid over the silicon V block.

A method of manufacturing an optical device array block for a multi channel optical transmitter/receiver module includes the steps of: plastic molding a connector body to receive a widely formed end portion of a metal lead frame;

inserting the metal lead frame into the connector body; bending said metal lead frame and cutting an end portion from the metal lead frame; manufacturing a silicon optical bench; attaching optical devices to the silicon optical bench; adhering said silicon optical bench to the connector body by inserting into a groove of the connector body; and connecting top and bottom electrodes of said optical devices to metal leads of the metal frame by a wire.

In another embodiment, an optical device array block for a multi channel optical transmitter/receiver module is further manufactured by molding the optical devices, the metal lead and the wire by an optical adhesive. The silicon optical bench can be made by the MEMS technique. A plurality of the optical devices are attached to the silicon optical bench at one time by soldering.

These and other embodiments of the invention are further discussed below with reference to the following figures.

In the figures, elements having the same designation in the various figures have the same or similar function.

DETAILED DESCRIPTION

Figure 1:
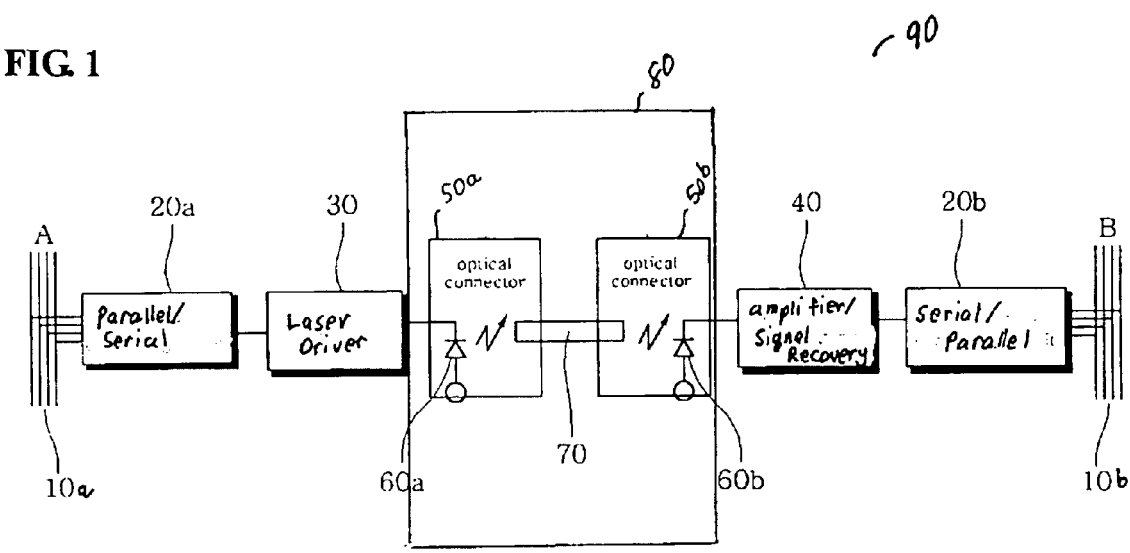
FIG. 1 shows a schematic block diagram of an optical transmitter/receiver system having an optical transmitter/receiver module according to the present inventions.

FIG. 1 illustrates a schematic block diagram of an optical transmitter and receiver system 90 having a multi channel optical transmitter/receiver module 80 according to the present invention. In FIG. 1, data is transmitted from a parallel data bus 10a at point A to a parallel data bus 10b at point B through multi channel optical transmitter/receiver module 80. Parallel data from parallel data bus 10a at point A is transformed to serial data for transmission by parallel/serial converting circuit 20a. The serial data is then input to a laser driving circuit 30, which transforms electrical signals representing the serial data to optical signals by appropriately driving a light source 60a in optical transmitter/receiver module 80. The optical signal is transmitted to a detector 60b in optical transmitter/receiver module 80 at a receiving sight near point B through an optical fiber 70. Detector 60b generates electrical signals based on the transmitted optical signals. Because the electrical signals coming from photodiode 60b may be weak, the electrical signals can be amplified and restored to digital format to recover the originally transmitted electrical signals by an amplifier/signal recovery circuit 40. The recovered electrical signals are then converted back to parallel data format by a serial/parallel converting circuit 20b and coupled to parallel data bus 10b at point B. The transmission of data from point A to point B is, then, accomplished by transmitting serial data through optical fiber 70. In general, optical transmitter and receiver system 90 can transmit either parallel formatted data or serially formatted data from point A to point B.

An optical transmitter/receiver module 80 converts the electrical signals representing serial data to optical signals, transmits the optical signals over a distance, and converts the optical signals to electrical signals representing the serial data. As shown in FIG. 1, optical transmitter/receiver module 80 includes a light source 60a for converting the electric signal to light, an optical fiber 70 for transmitting the light and a light detector 60b for reconverting the transmitted light to electric signals. An optical connector 50a couples light from light source 60a into optical fiber 70 and another optical connector 50b couples light from optical fiber into light detector 60b. Light source 60a must be accurately arranged with respect to optical fiber 70 in order to optimize the coupling of light into optical fiber 70. Optical fiber 70 must also be accurately arranged with respect to light detector 60b in order to optimize the coupling of light from optical fiber 70 into detector 60b. The transfer of optical signals between source 60a and detector 60b, then, should be optimized to reduce the signal power loss, better enabling the restoration of the electrical signals originally transmitted. Therefore, it is very important to accurately align the output beam of light source 60a to optical fiber 70 and the output beam from optical fiber 70 to light detector 60b at optical connectors 50a and 50b, respectively.

Generally, light source 60a can be a laser diode (e.g., an edge emitting laser diode or a surface emitting laser diode) or LED and detector 60b can be a photodiode, although any other source of light or detection system can be used. An edge emitting laser diode should be diced for testing of the chip characteristics. A surface emitting laser diode, however, enables testing of chip characteristics on the wafer unit without dicing and is suitable for mass production. Additionally, surface emitting laser diodes have the advantage of requiring a lower driving current than edge emitting laser diodes. Also, because the light beam from an edge emitting laser diode is badly distorted with an elliptical shape, it is difficult to couple the beam into the circularly shaped cross section of the optical fiber. An emitted light beam from a surface emitting laser diode can be the same circular shape as the cross section of the optical fiber and most of the emitted light beam can be coupled into the optical fiber. Therefore, surface emitting laser diodes are better suited for a passive alignment method because the passive alignment method is less accurate than the active alignment method.

Optical fiber 70 can be classified as a single mode or multi mode depending on a core size of optical fiber 70, which is typically made from silica or plastic. A single mode optical fiber is more suitable than multi mode optical fibers for high-speed, long-distance transmission of data. Optical fibers made from silica have better transmission properties, leading to less power loss, than optical fibers made from plastic. Because the core diameter of a single mode silica optical fiber is less than about 10 µm, it is very difficult to align source 60a to optical fiber 70 in order to couple light from light source 60a to optical fiber 70. Therefore, connector 50a needs to be a high accuracy optical connector. Alternatively, a multi mode optical fiber having a core diameter of more than 50 µm requires relatively little accuracy in alignment in order to couple light from source 60a to optical fiber 70. A plastic optical fiber typically has a core diameter of about 250~1000 µm and therefore it is relatively easy to couple light into and out of the optical fiber.

Figure 2:
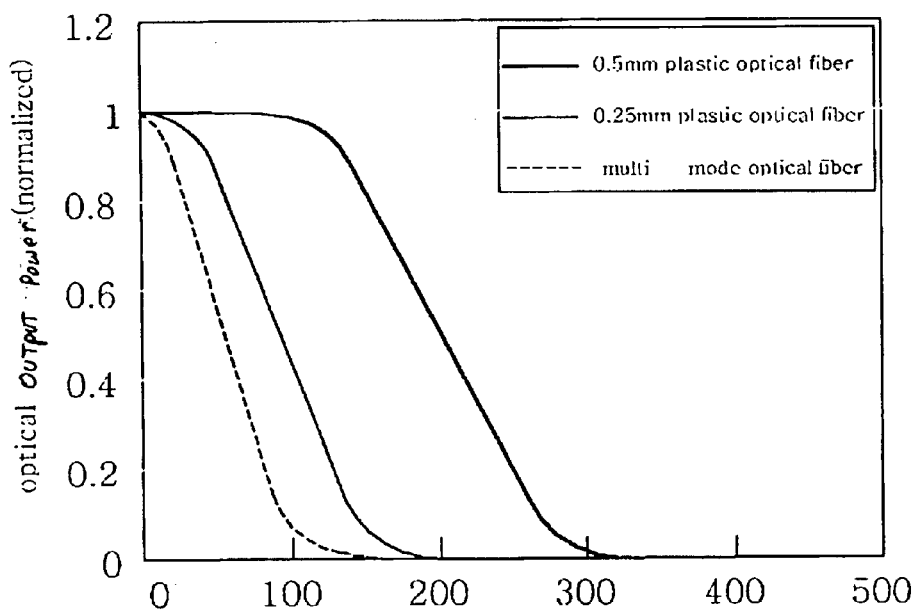
FIG. 2 shows the variation of the output power from an optical fiber depending on the horizontal distance between the beam from a laser diode and the center of the cross-section of an optical fiber.
Figure 3:
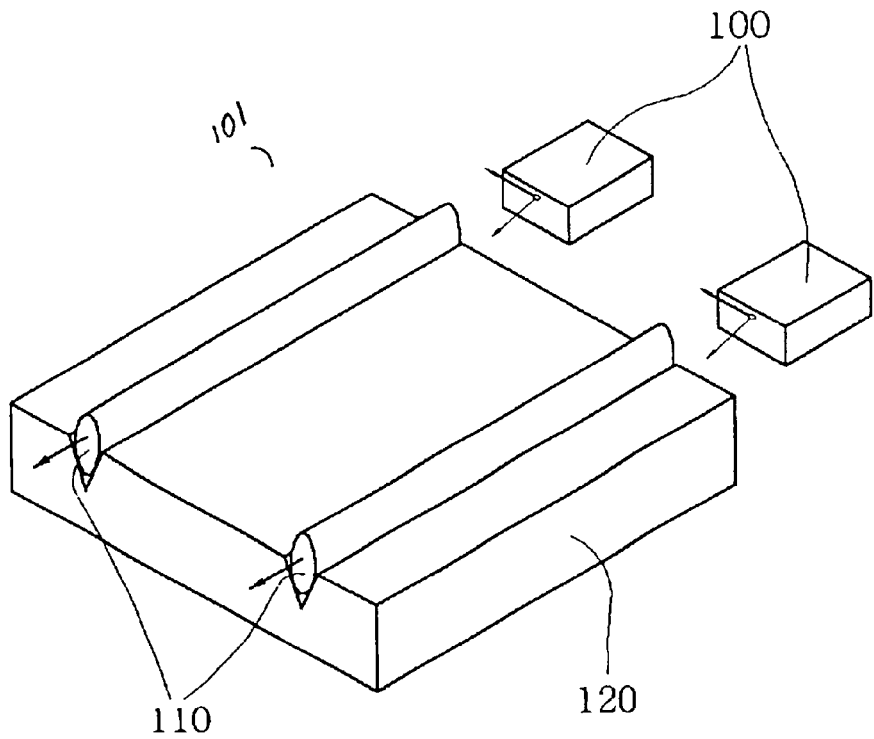
FIG. 3 shows an exemplary schematic diagram illustrating an active alignment method for a multi channel optical connector module.
Figure 4:
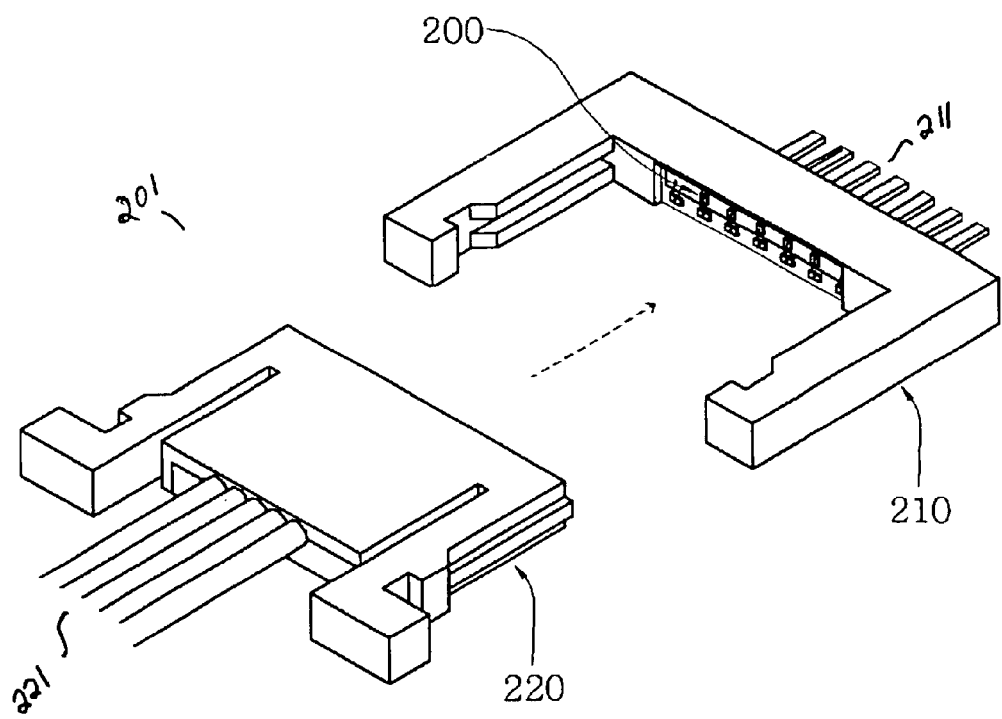
FIG. 4 shows an exemplary schematic diagram illustrating a passive alignment method for a multi channel optical transmitter module.

FIG. 2 shows a graph of light beam power versus the distance that an output beam from a light source is separated from the center of a cross section of an optical fiber. Plastic optical fiber, with a core diameter of 0.5 mm, has an output power nearly 100% that of the maximum output power even if light beam from the light source is miss-aligned by about 100 µm from the center of the optical fiber. In contrast, if multi mode optical silica fiber is miss-aligned by approximately 20 µm, the output power of the optical fiber is sharply reduced.

As an additional difficulty, a typical photodiode utilized in high-speed transmission systems has a light receiving area with diameter of about 100~200 µm. Because the photodiode has such a small diameter, optical fiber 70 needs to be precisely aligned with photodiode 60b in optical connector 50b.

Figure 5:
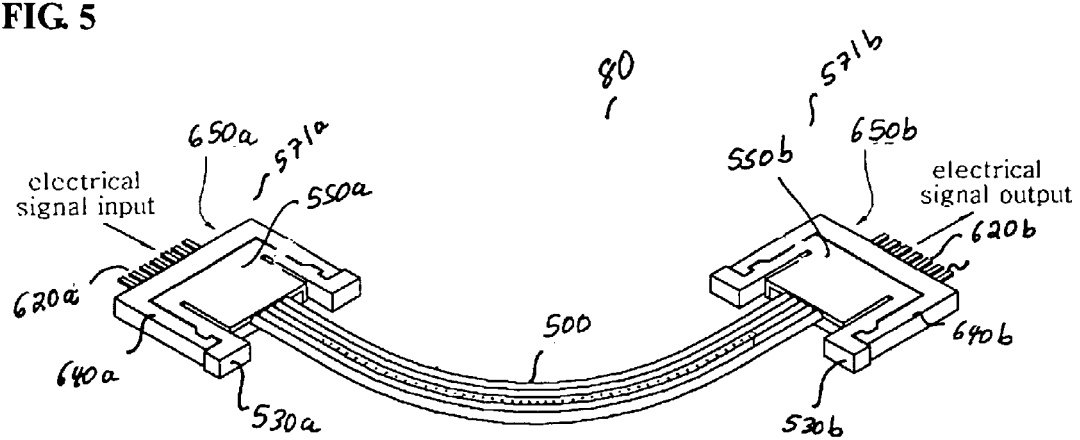
FIG. 5 shows a schematic diagram of an optical transmitter/receiver module according to the present invention.
Figure 6:
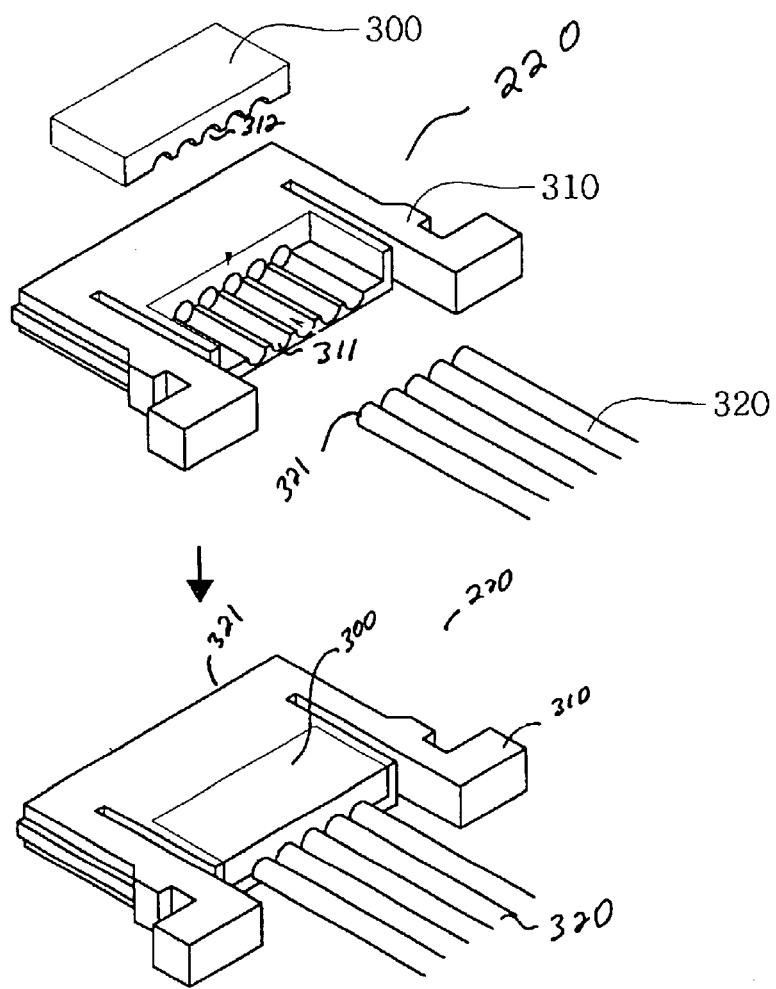
FIG. 6 shows an assembly diagram of a conventional method of implementing the passive alignment method for the multi channel optical fiber block.

FIG. 5 shows a schematic diagram of a multi channel transmitter/receiver module 80 according to an embodiment of the present invention. An electrical signal is input to a light source in device array block 650a through one of electrical conductors 620a. The light source converts the electrical signal to an optical signal, which is coupled into a corresponding one of optical fibers 500 in multi channel optical fiber block 550a and transmitted to multi channel optical fiber block 550b. The light is then coupled from one of optical fibers 500 to a detector in optical device array block 650b. The detector in optical device array block 650b reconverts each of the transmitted optical signals to electrical signals and couples the electrical signals to the corresponding one of conductors 620b.

In some embodiments of the invention, optical device array block 650 includes a connector body 640a which receives and affixes in place a connector body 530a of multi channel optical fiber block 550a. Correspondingly, optical device array bock 650b can include a connector body 640b which receives and affixes in place a connector body 530b of multi channel optical fiber block 550b.

Figure 8:
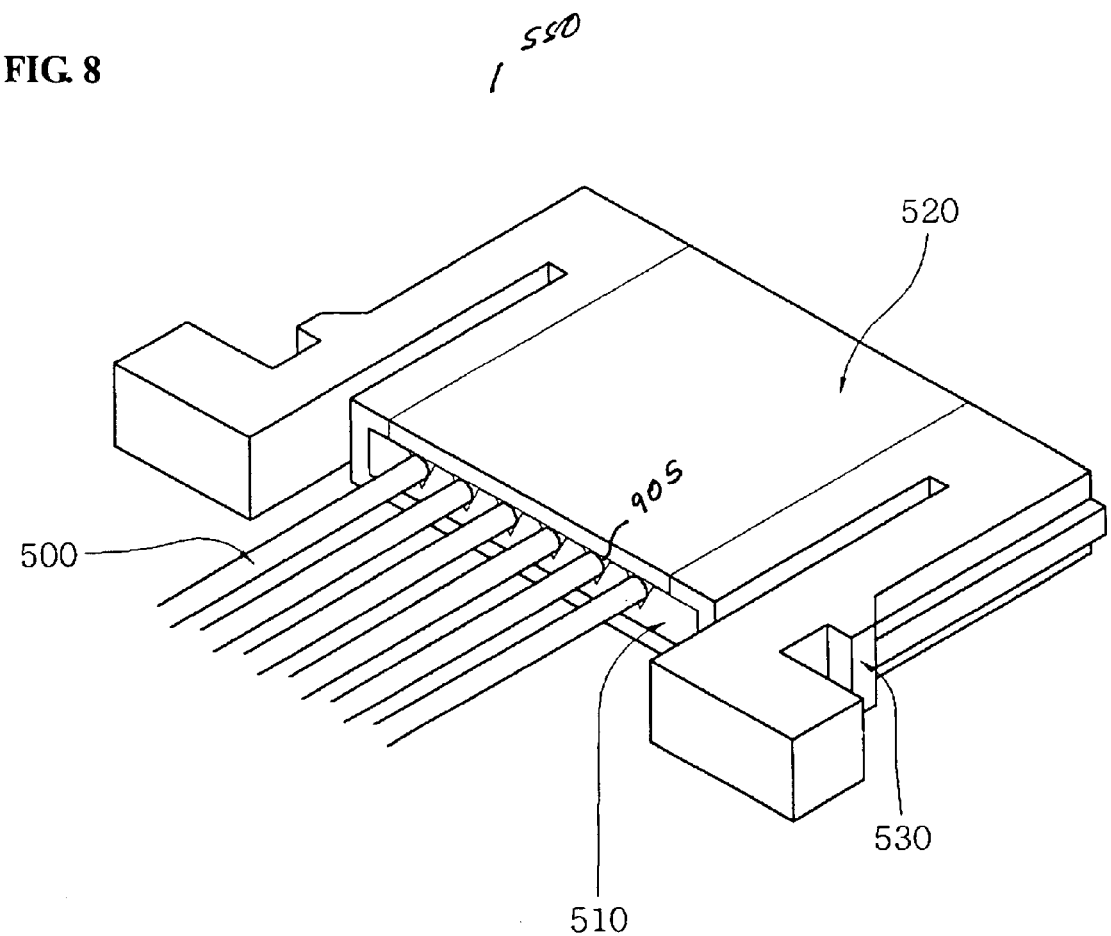
FIG. 8 shows a schematic diagram of a multi channel optical fiber block according to an embodiment of the present invention.

FIG. 8 is a schematic diagram of a multi channel optical fiber block 550 (which can be either of block 550a or 550b of FIG. 5) having a silicon V-block 510 according to an embodiment of the present invention. Silicon V-block 510 includes a series of V-grooves 905 into which individual ones of optical fibers 500 are positioned. The V-grooves 905 enable the use of small diameter optical fibers (for example a single mode silica optical fiber) in optical transmitter/receiver module 80. Silicon V-block 510, with V-grooves 905, has higher achievable tolerance for alignment of optical fiber 500 than conventional plastic molding and is amenable to mass production. Multi channel optical fiber block 550 includes a bundle of optical fibers 500, a silicon V-block 510 for guiding and aligning the bundle of optical fibers 500, a cover 520 and a connector body 530, which is plug-able to corresponding connector body 640 optical device array block 650. Silicon V-block 510 is precisely grooved with V-grooves having uniform intervals for aligning the bundle of optical fibers 500 by using processing techniques similar to that utilized for producing MEMS (Micro Electro Mechanical System) devices (the MEMS technique).

Figure 9:
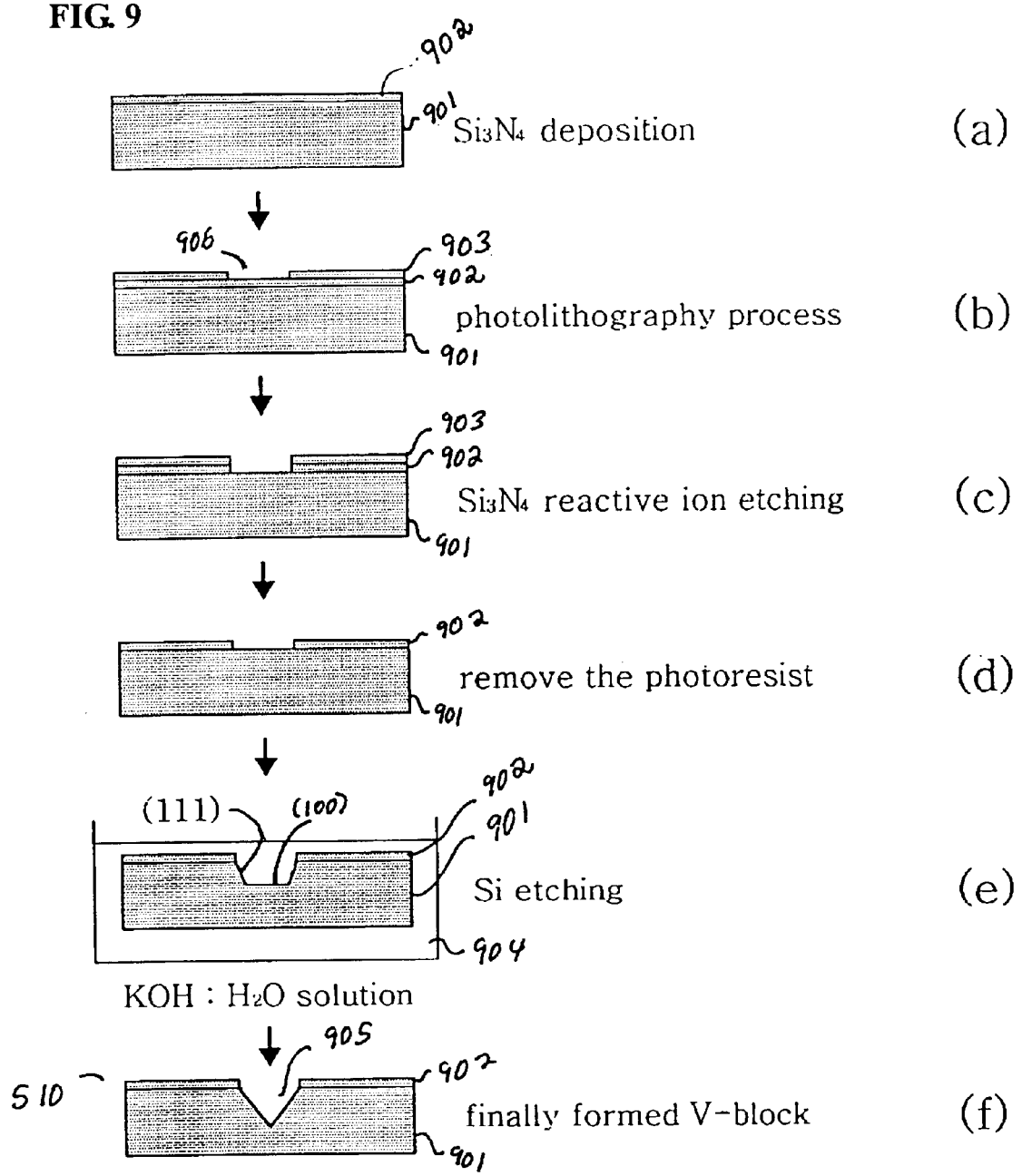
FIG. 9 illustrates a manufacturing process for the silicon V block according to an embodiment of the present invention.

FIG. 9 illustrates a method of manufacturing a silicon V-block 510 with V-grooves 905 according to the present invention. In FIG. 9(a), a thin $Si_3N_4$ film 902 is deposited on a silicon substrate 901. In FIG. 9(b), a photoresist 903 is coated on the silicon substrate. A pattern 906 for locating V grooves 905 is formed in a photo-lithography process. As shown in FIG. 9(c), $Si_3N_4$ film 902 is etched. Etching of film 902 can be accomplished by any number of etching processes, including plasma etching and reactive ion etching (RIE). The etching of film 902 provides patterning for the formation of V-grooves 905 in silicon layer 901 with $Si_3N_4$ film 902 forming a mask for further etching of substrate 901. In FIG. 9(d), photoresist layer 903 is removed. In FIG. 9(e), silicon substrate 901 is further etched by being submerged in a $KOH:H_2O$ solution 904. Because the difference between the etching rate of the (100) surface of silicon substrate 901 and the etching rate of the (111) surface of silicon substrate 901 is about 100:1, as shown in FIG. 9(f) V grooves 905 are formed in silicon substrate 901. Silicon V-block 510 can have V-grooves 905 located within a tolerance of about 1 µm. Therefore, it is suitable for positioning either the multi mode silica optical fiber and the single mode silica optical fiber, which requires much greater tolerances.

Figure 10:
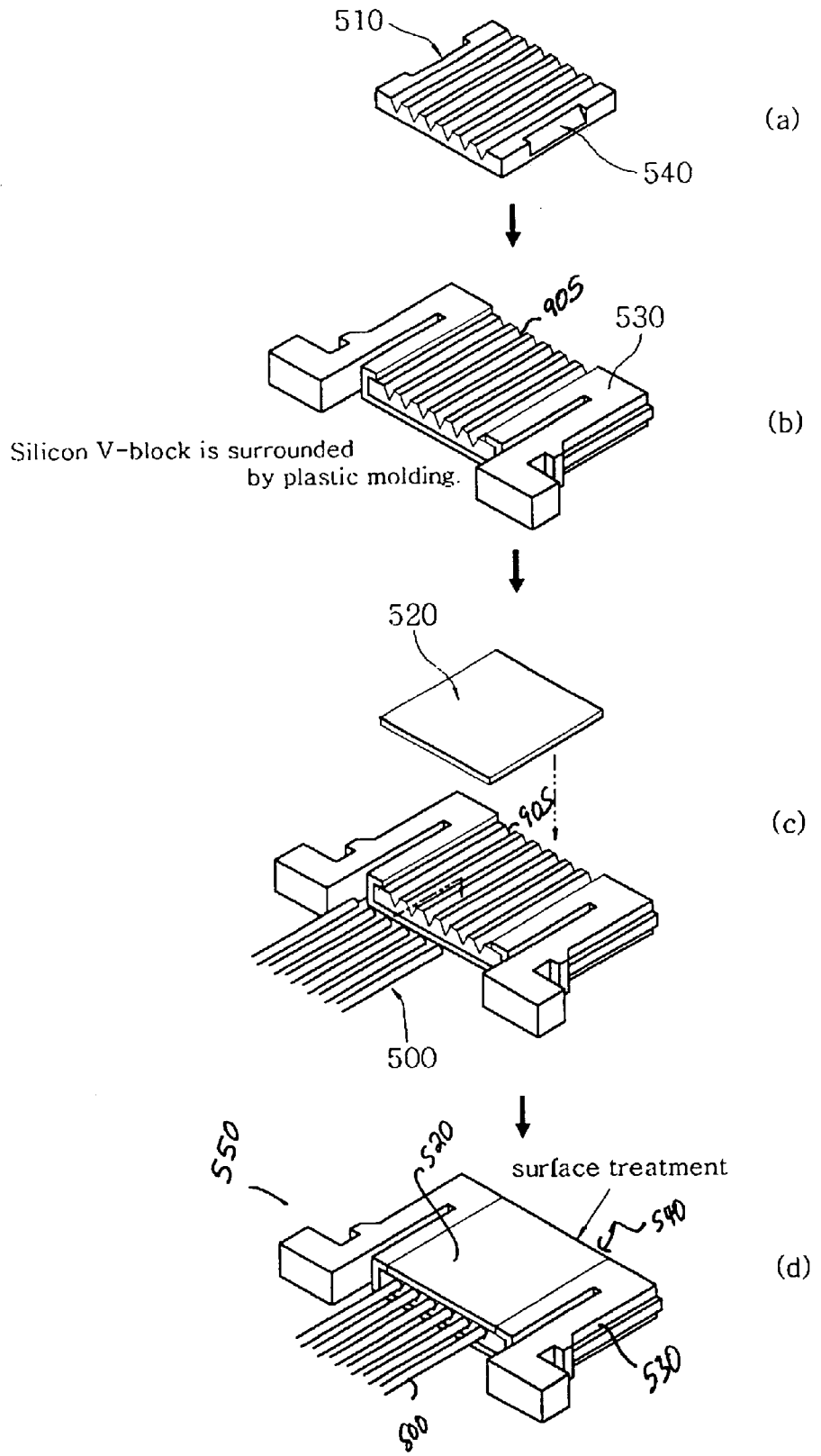
FIG. 10 illustrates assembly of the multi channel optical fiber block according to the present invention.

FIGS. 10a through 10d illustrate assembly of multi channel optical fiber block 550 having a V-block 510. In FIG. 10(a), V-block 510 is provided with a notch 540 on at least one side. In FIG. 10(b), silicon V-block 510 is inserted into connector body 530, which can be made by plastic molding. Silicon V-block 510 is positioned and fixed within connector body 530 when notches 540 on both sides of silicon V-block 510 are snapped into corresponding protrusions formed in connector 530. In FIG. 10(c), a bundle of optical fibers 500 are positioned into V-grooves 905 and epoxied in place. A cover 520 is then placed over silicon V-block 510 in order to protect and assist fixing fibers 500 in place. Cover 520 may include V-grooves positioned similarly to those produced in silicon V-block 510. Next, as shown in FIG. 10(d), end facets 540 of each of optical fibers 500 are treated, for example polished. The assembly of multi channel optical fiber block 550, then, is completed.

Figure 11:
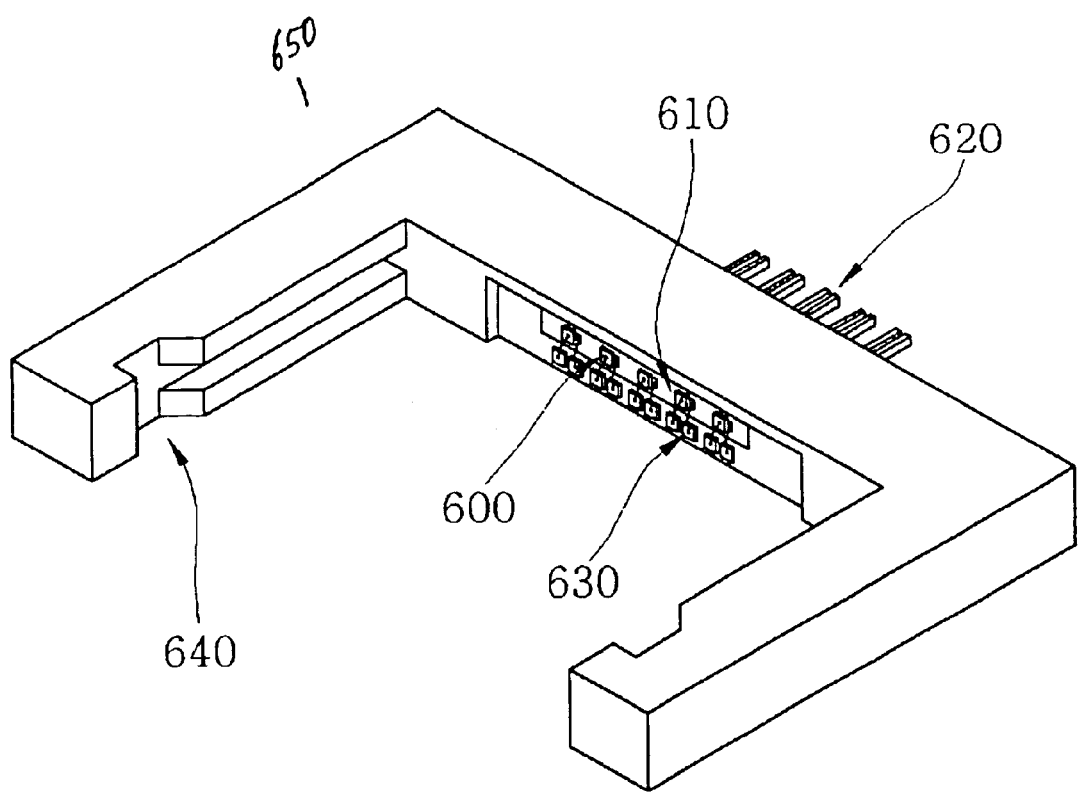
FIG. 11 shows a schematic diagram of an optical device array block installed on a silicon optical bench according to an embodiment of the present invention.

FIG. 11 shows an optical device array block 650 having a silicon optical bench 610 of the present invention. Grooves are made on block 610 for locating and fixing optical devices 600 such that, in most embodiments, optical devices 600 are arranged with uniform intervals (i.e., the same uniform intervals as V-grooves 905). Optical devices 600 are inserted and soldered into grooves 1209. Silicon optical bench 610 can be made by the MEMS technique similar to silicon V block 510 (FIG. 9). Silicon optical bench 610 enables optical devices (i.e. laser diodes and photodiodes) to be located with a tolerance of within about 1 µm.

Optical device array block 650 includes a connector body 640 which can receive connector body 530 of multi channel optical fiber block 510, optical devices 600 received into silicon optical bench 610, and metal leads 620 for transmitting electrical signals to or from optical devices 600. Optical devices 600 can include both light sources (e.g. laser photodiodes) and detectors (e.g., photodiode detectors). Silicon optical bench 610 is inserted into place in optical device array block 650 in a way which allows electrical coupling to and alignment of optical devices 600.

Silicon optical bench 610 is designed to simply receive optical devices 600 into well positioned grooves formed in silicon optical bench 610. Therefore, no expensive equipment for aligning optical devices 600 is required. It therefore has the advantages of faster assembly and is amenable to mass production. Additionally, all of optical devices 600 can be affixed at one time by heating silicon optical bench 610 after inserting optical devices 600 into grooves 1209.

Figure 7:
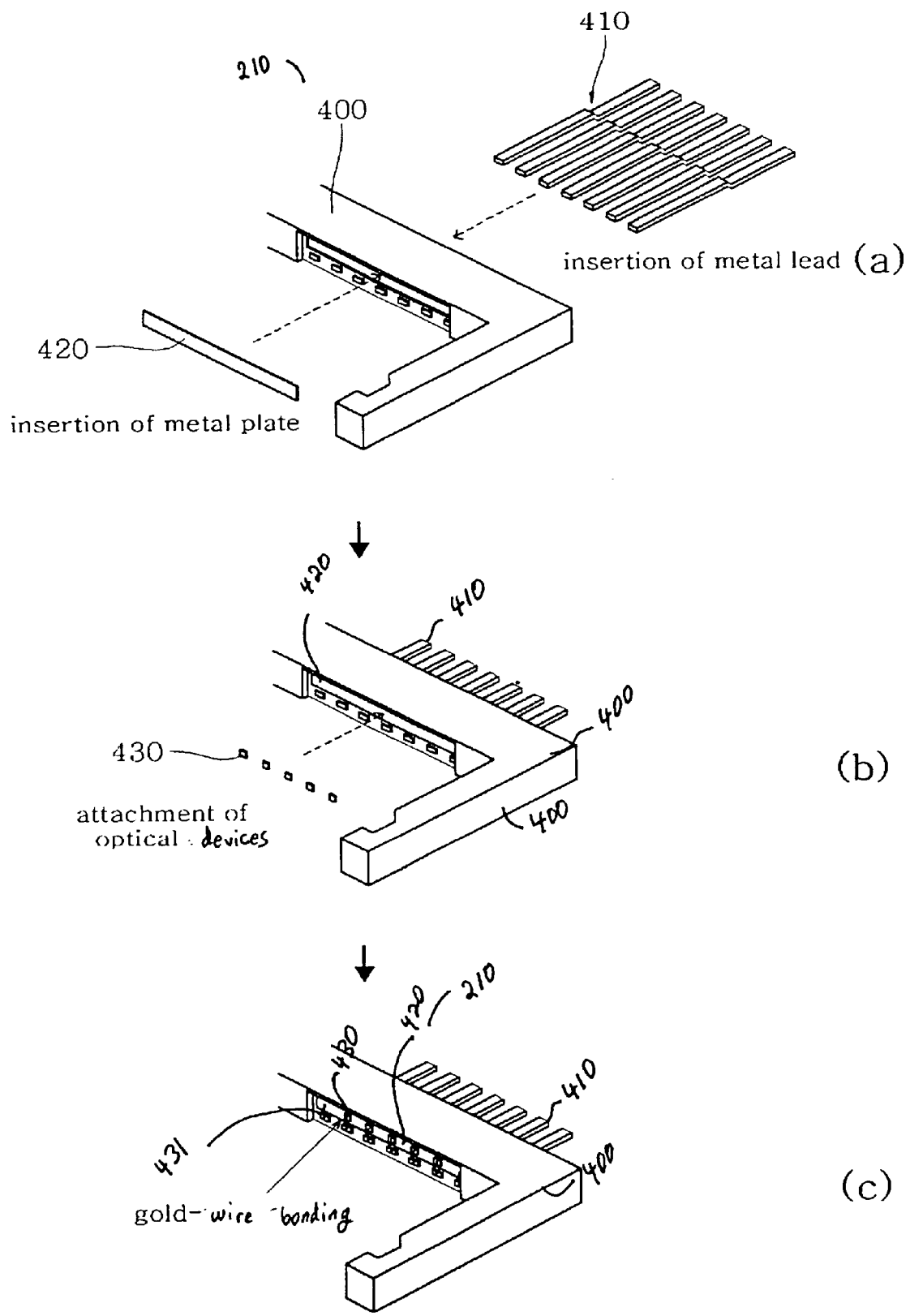
FIG. 7 shows an assembly diagram of a conventional method of implementing the passive alignment for the optical device array block

Using an undopped non-conductive silicon substrate or an insulating film coated silicon substrate for silicon bench 610 does not form a common electrode under optical devices 600, as does metal plate 420 of conventional optical device array block 440 of FIG. 7. The bottom electrode of each of optical devices 600 is electrically separated and electrically coupled to individual metal leads. Therefore, high frequency signals are transmitted without interference or noise from metal plate 420, which acts as an antenna. Instead of thin metal lead 620, a wide surface electrical pad 630 is adapted for coupling to optical devices 600. Electrical coupling can therefore be performed by a ball bonding technique rather than with a conductive epoxy. Ball bonding techniques are faster than epoxy bonding for connecting wires and are better suited for mass production. Ball bonding also creates connections with good transmission properties for high frequency signals.

FIGS. 12*a* through 12*j* illustrate a manufacturing method for producing silicon optical bench 610. In FIG. 12(*a*), a thin SiNx film 1202 is deposited on a silicon substrate 1201. In FIG. 12(*b*), a photoresist layer 1203 is deposited and patterned for locations of grooves 1209 (FIGS. 12*d* through 12*j*) in a photo lithography process. In FIG. 12(*c*), thin SiNx film 1202 is etched in a plasma etching or reactive ion etching process. In FIG. 12(*d*), the processed substrate is submerged into a KOH solution for etching of substrate 1201, forming groove 1209. In FIG. 12(*e*) thin SiNx film 1202 is removed and an insulating layer 1204 is formed, for example by forming a $SiO_2$ layer or by depositing a $SiN_x$ layer. FIG. 12(*f*) shows deposition and patterning of photoresist layer 1205 in a second photo lithography process. Photoresist layer 1205 is patterned for location of a metal pad 1206. In FIG. 12(*g*), a thin metal film 1206 is deposited. In FIG. 12(*h*), photoresist layer 1205 is removed, lifting off most of metal film 1206 to form metal pad 1206. Metal pad 1206 electrically couples from the bottom of groove 1209 to the top surface of silicon bench 610 adjacent to groove 1209. The portion 650 of metal pad 1206 can be utilized for electrical connections between the bottom electrode of an optical device 600 and metal leads 620. FIG. 12(*i*) shows deposition and patterning of another photoresist layer 1207. Photoresist layer 1207 is patterned for deposition of solder layer 1208. Finally, in FIG. 12(*j*), solder metal layer 1208 is deposited and photoresist layer 1207 is removed, lifting off most of solder metal layer 1208 leaving a solder point 1208. Through the process of FIGS. 12(*a*) to (*j*), silicon optical bench 610 is formed.

Figure 12:
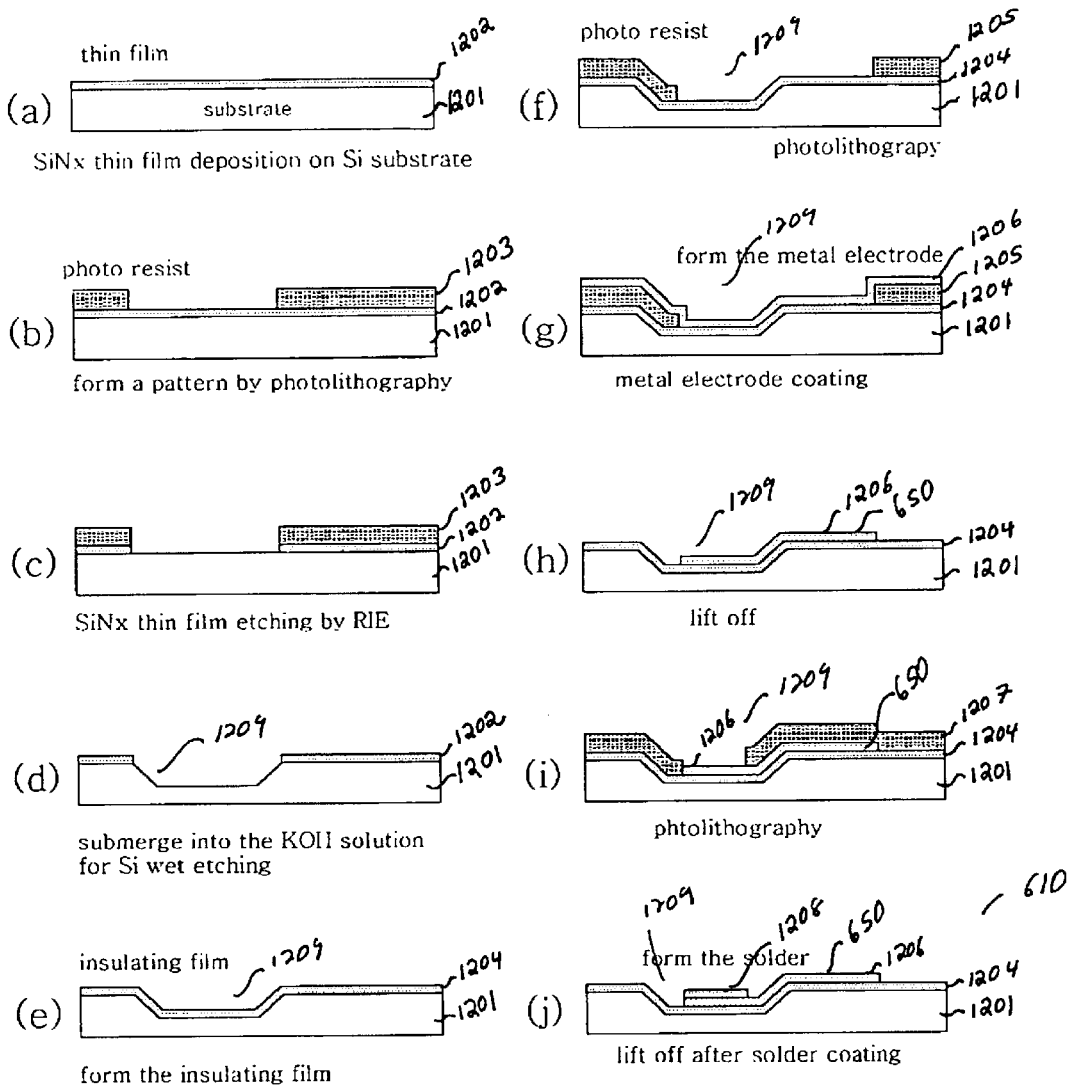
FIG. 12 illustrates a manufacturing process of the silicon optical bench according to an embodiment of the present invention.
Figure 13:
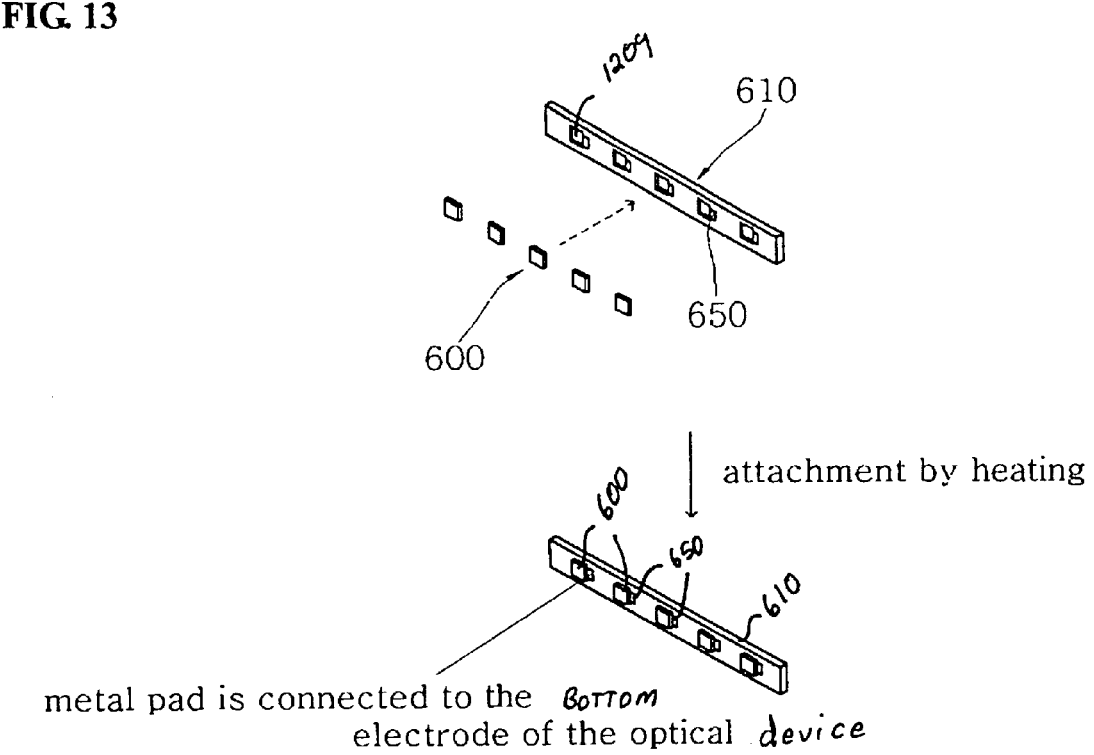
FIG. 13 illustrates assembly of the silicon optical bench and the optical device array according to an embodiment of the present invention.

FIG. 13 shows an assembly diagram illustrating placement of optical devices 600 on silicon optical bench 610. A silicon optical bench 610 (nonconductive) is provided, for example as shown in FIG. 12, by a MEMS technique. In order to connect the bottom electrode of each optical device 600 to one of metal leads 620, a metal pad 1206 at the bottom of each groove 1209 (FIG. 12) allows coupling of the bottom electrode of each of optical devices 600, from a portion 650 of metal pad 1206 located outside of groove 1209 on the surface of silicon optical bench 610. Thus, metal pad 1260 (conductive) is formed and coated with a solder 1208 enabling soldering to optical device 600. Optical devices 600 (e.g., laser diodes or photodiodes) are inserted into grooves 1209 of silicon optical bench 610. Silicon bench 610, with optical devices 600, is then heated to about 200~300° C. to melt solder layer 1208 (FIG. 12), attaching optical device 600 to silicon optical bench 610 and electrically coupling the bottom electrode of optical device 600 to portion 650 of metal pad 1206. An advantage of this method is that all of optical devices 600 are soldered to silicon optical bench 610 at one time.

Figure 14:
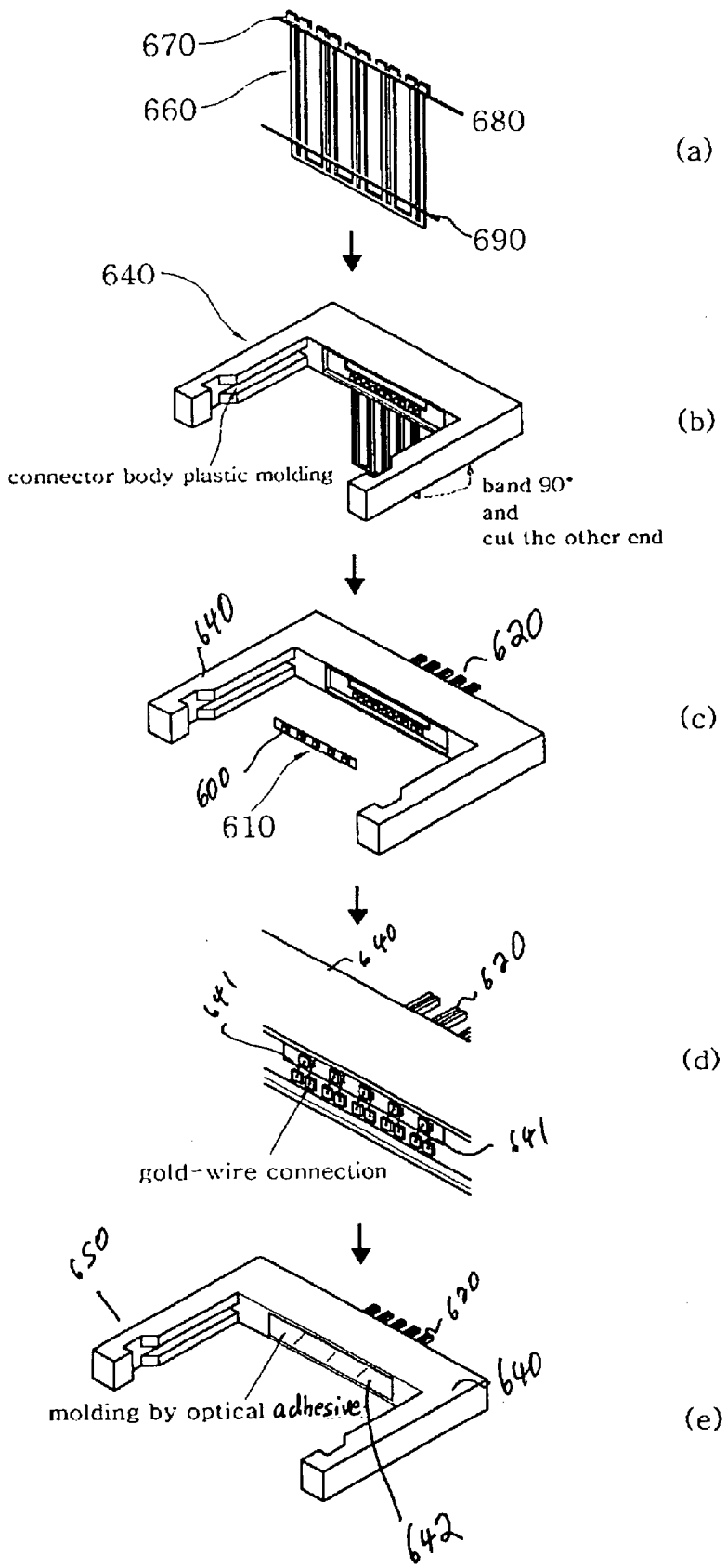
FIG. 14 illustrates assembly of the optical device array block and the silicon optical bench according to an embodiment of the present invention.

FIG. 14 shows a method of assembly of optical device array block 650 having a silicon optical bench 610 according to the present invention. FIG. 14(*a*), shows a metal lead frame 660 where each metal lead has a wide end surface pad 670. Metal lead frame 660 includes a bend line 680 and a cut line 690 opposite wide end surface pads 670. As shown in FIG. 14(*b*), metal lead frame 660 is inserted into molded plastic formed connector body 640. Metal lead frame 660 is bent along the bend line 680 (for example, by 90°) and cut along cut line 690 to form metal leads 620. The ends of metal leads 620 can then be separated from each other for electrical isolation. In the conventional technology, the cutting surface of the metal lead frame 660 is used as a pad. Due to a small cutting surface of metal lead frame 660, it is not easy to perform a wire bonding. However, wide pads 670 of metal leads 620 are wide enough surfaces to bond wires by ball bonding. As shown in FIG. 14(*c*), silicon optical bench 610, after optical devices 600 have been inserted, is inserted into connector 640 and fixed in place with an adhesive. As shown in FIG. 14(*d*), the top electrode of each of optical devices 600 and a corresponding one of metal leads 620 are connected by a wire 641, which can be a gold wire. Metal pad portion 650 of silicon optical bench 610, which is coupled to the bottom electrode of optic device 600, and a corresponding one of metal leads 620 are also connected by a wire 641. As shown in FIG. 14(*e*), for protecting optical devices 600, an optical adhesive 642 can be poured into grooves 1209 of silicon optical bench 610 and over wide pads 670 and cured. Optical adhesive 642 must be transparent to light emitted or received by optical devices 600. Optical devices 600, then, have a transparent protection film for avoiding possible damages or deposition from environmental exposure.

Optical device array block 650 can be used as either the transmitter portion or receiver portion of transmitter/receiver 80 (FIG. 1). If optical devices 600 are laser diodes, then optical device array block 650 is an optical transmitter 50*a* (FIG. 1). If optical devices 600 are photodiodes, then optical device array block 650 would be an optical receiver 50*b* (FIG. 1). Additionally, in a system where bi-directional transmission is required and some of optical devices 600 are light sources and others of optical devices 600 are detectors, then separate optical device array blocks 650 can be matched to form a transmitter/receiver system.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein. As such, the invention is limited only by the following claims.

What is claimed is:

1. A multi channel optical transmitter/receiver module having an optical connector, the optical connector comprising:
   an optical device array block including at least one optical device, the optical device array block including a silicon optical bench having a series of grooves for inserting, attaching and arranging the at least one optical device, each of the grooves of the silicon block having associated therewith a metal pad formed on the silicon block, each metal pad having a first portion of located in its associated groove and a second portion located on the silicon block outside of its associated groove, the at least one optical device being coupled to the first portion of the metal pad of the groove associated with the at least one optical device;
   a multi channel optical fiber block receivable by the optical device array block, the multi channel optical fiber block including at least one optical fiber being coupled to said optical device array block in order to transmit an optical signal and a silicon V block for aligning each of the at least one optical fiber in one of a series of V-shaped grooves.

2. The module as in claim 1, wherein each of the at least one optical device has a top electrode and a bottom electrode, said bottom electrode of the optical device being electrically coupled to said first portion of said metal pad, said top electrode and said second portion of the metal pad being connected to metal leads by a wire.

3. The module in claim 2, wherein the metal leads have a wide pad surface for ball bonding wires.

4. The module as in claim 3, wherein said top electrode and said second portion of said metal pad are coupled to metal leads by a ball-bonded wire.

5. The module as claimed in claim 1, further including an optical adhesive covering the at least one optical device.

6. The module as claim 3, further including an optical adhesive covering the at least one optical device and the wide pad surface of the metal leads.

7. The module as in claim 4, further including an optical adhesive covering the at least one optical device, the wide pad surface of the metal leads, and the ball-bonded wires.

8. The module as in claim 1, wherein said silicon optical bench and said silicon V block each include grooves formed in a silicon substrate.

9. The module as in claim 2, wherein the silicon optical bench is of insulating material, wherein each bottom electrode of the optical device is electrically isolated and individually connected to the wide pad surface of one of the metal leads.

10. The module as in claim 2, wherein a top surface of said silicon optical bench further includes an insulating film, wherein each bottom electrode of the optical device is electrically isolated and individually connected to the wide pad surface of one of the metal leads.

11. The module as in claim 1, wherein the at least one optical device includes a light source and a detector, thereby enabling bi-directional data transmission.

12. The module as in claim 1, further including a second optical connector, the second optical connector comprising:
   a second optical device array block including at least one optical device, the second optical device array block including a silicon optical bench having a series of grooves for inserting, attaching and arranging the at least one optical device; and
   a second multi channel optical fiber block receivable by the second optical device array block, the second multi channel optical fiber block including at least one optical fiber being coupled to said optical device array block in order to transmit an optical signal and a silicon V block for aligning each of the at least one optical fiber in one of a series of V-shaped grooves,
   wherein a light source of the at least one optical device of the optical device array block transmits light signals to a detector of the at least one optical device of the second optical device array block via one of the at least one optical fibers.

13. The module of claim 12, wherein a detector of the at least one optical device of the optical device array block receives light signals from a light source of the at least one optical device of the second optical device array block via one of the at least one optical fibers.

14. The module of claim 1, wherein the at least one optical devices includes a laser diode.

15. The module of claim 1, wherein the at least one optical devices includes a photodiode.

16. A method of producing a connector for an optical transmitter/receiver module, comprising:
   forming a multi channel optical fiber block by
      producing a V-block with a V-shaped groove,
      inserting the V-block into a fiber block connector housing, and
      affixing an optical fiber in the V-shaped groove; and
   forming an optical device array block by
      producing a silicon bench having a positioning groove, the positioning groove having a first end portion of a metal pad therein, the metal pad having a second end portion on the silicon bench outside the positing groove,
      positioning an optical device into the positioning groove,
      affixing the optical device to the first end portion of the metal pad so that an bottom electrode of the optical device is electrically coupled to the metal pad,
      positioning and affixing the silicon bench into an optical device array block connect housing,
      affixing a plurality of metal leads into the optical device array block connector housing, each metal lead having a wide pad,
      electrically coupling the second end of the metal pad to the wide pad of a first of the metal leads to electrically couple the bottom electrode of the optical device to the first metal lead, and
      electrically coupling a top electrode of the optical device to the wide pad of a second of the metal leads;
   wherein the optical device array block connect housing is capable of receiving the fiber block connector housing such that the optical fiber is aligned with to the optical device.

17. An optical device array block for an optical connector, comprising:
   a connector body having a portion adapted for coupling to an optical fiber block;
   an optical bench coupled to the connector body, the optical benching having a groove;
   an electrically conductive pad formed on the optical bench, the pad having a first portion in the groove of the optical bench;
   an optical device positioned in the groove and having a first electrode electrically coupled to the first portion of the pad;

a plurality of leads for transmitting electrical signals each having an end portion coupled to the connector body;

the end of a first of the leads electrically coupled to a second portion of the pad located on a region of the optical bench located outside the groove;

the end of a second of the leads electrically coupled to a second electrode of the optical device; and the optical bench comprises an electrically insulating material so that the coupling between the pad and the end of the first lead is electrically isolated from the electrical coupling between the end of the second lead and the second electrode of the optical device.

* * * * *